(12) United States Patent
Laroia et al.

(10) Patent No.: US 8,594,733 B2
(45) Date of Patent: Nov. 26, 2013

(54) METHODS AND APPARATUS FOR USING POLARIZED ANTENNAS IN WIRELESS NETWORKS INCLUDING SINGLE SECTOR BASE STATIONS

(75) Inventors: Rajiv Laroia, Far Hills, NJ (US); Vikram Reddy Anreddy, Bridgewater, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1479 days.

(21) Appl. No.: 12/044,965

(22) Filed: Mar. 8, 2008

(65) Prior Publication Data
US 2009/0227292 A1  Sep. 10, 2009

(51) Int. Cl.
*H04M 1/00* (2006.01)
(52) U.S. Cl.
USPC ............... 455/562.1; 455/449; 455/575.7; 455/446; 455/444; 455/561
(58) Field of Classification Search
USPC .......................... 455/562.1, 575.7
See application file for complete search history.

(56) References Cited

U.S. PATENT DOCUMENTS

| | | | |
|---|---|---|---|
| 4,475,246 A | | 10/1984 | Batlivala et al. |
| 5,691,727 A | | 11/1997 | Cyzs |
| 5,898,362 A | | 4/1999 | Ibanez-Meier et al. |
| 5,949,793 A | * | 9/1999 | Bossard et al. ............... 370/487 |
| 6,088,003 A | | 7/2000 | Bassirat |
| 6,094,165 A | | 7/2000 | Smith |
| 6,205,337 B1 | | 3/2001 | Boch |
| 6,259,419 B1 | | 7/2001 | Monte |
| 6,275,704 B1 | | 8/2001 | Dixon |
| 6,546,236 B1 | | 4/2003 | Canada et al. |
| 6,748,218 B1 | | 6/2004 | Johnson et al. |
| 6,980,806 B2 | * | 12/2005 | Muramoto et al. ........... 455/446 |
| 7,359,675 B2 | | 4/2008 | Lastinger et al. |
| 7,483,718 B2 | | 1/2009 | Catreux-Erceg et al. |
| 7,991,374 B2 | | 8/2011 | Laroia et al. |

(Continued)

FOREIGN PATENT DOCUMENTS

| | | |
|---|---|---|
| EP | 1770874 | 4/2007 |
| GB | 2401994 | 11/2004 |
| WO | WO2005060574 | 7/2005 |

OTHER PUBLICATIONS

International Search Report and Written Opinion—PCT/US2009/035036, International Search Authority—European Patent Office—Jul. 28, 2009.

*Primary Examiner* — Kashif Siddiqui
*Assistant Examiner* — Sayed T Zewari
(74) *Attorney, Agent, or Firm* — Joseph B. Agusta

(57) ABSTRACT

Methods and apparatus for using multiple antennas having different polarizations are described. Polarized antennas are advantageously deployed in a cellular network. Some of the cells utilize an antenna with a first direction polarization, while cells use an antenna with a second direction polarization, for a given carrier. Various embodiments are directed to methods and apparatus related to base station deployment which set up and/or operate base stations in accordance with an advantageous reuse pattern from the perspective of inter-cell interference. In some embodiments a plurality of carriers are used in addition to a plurality of different polarization direction antennas. In some such embodiments, a base station is configured so that for a given cell different carriers are associated with different direction polarization antennas. Some embodiments are directed to single sector base station implementations.

25 Claims, 10 Drawing Sheets

(56) References Cited

U.S. PATENT DOCUMENTS

| | | | |
|---|---|---|---|
| 2004/0095278 A1* | 5/2004 | Kanemoto et al. | ..... 343/700 MS |
| 2006/0252461 A1 | 11/2006 | Grant et al. | |
| 2007/0205955 A1 | 9/2007 | Korisch et al. | |
| 2008/0287163 A1 | 11/2008 | Skarby et al. | |
| 2009/0022499 A1 | 1/2009 | Roy et al. | |

\* cited by examiner

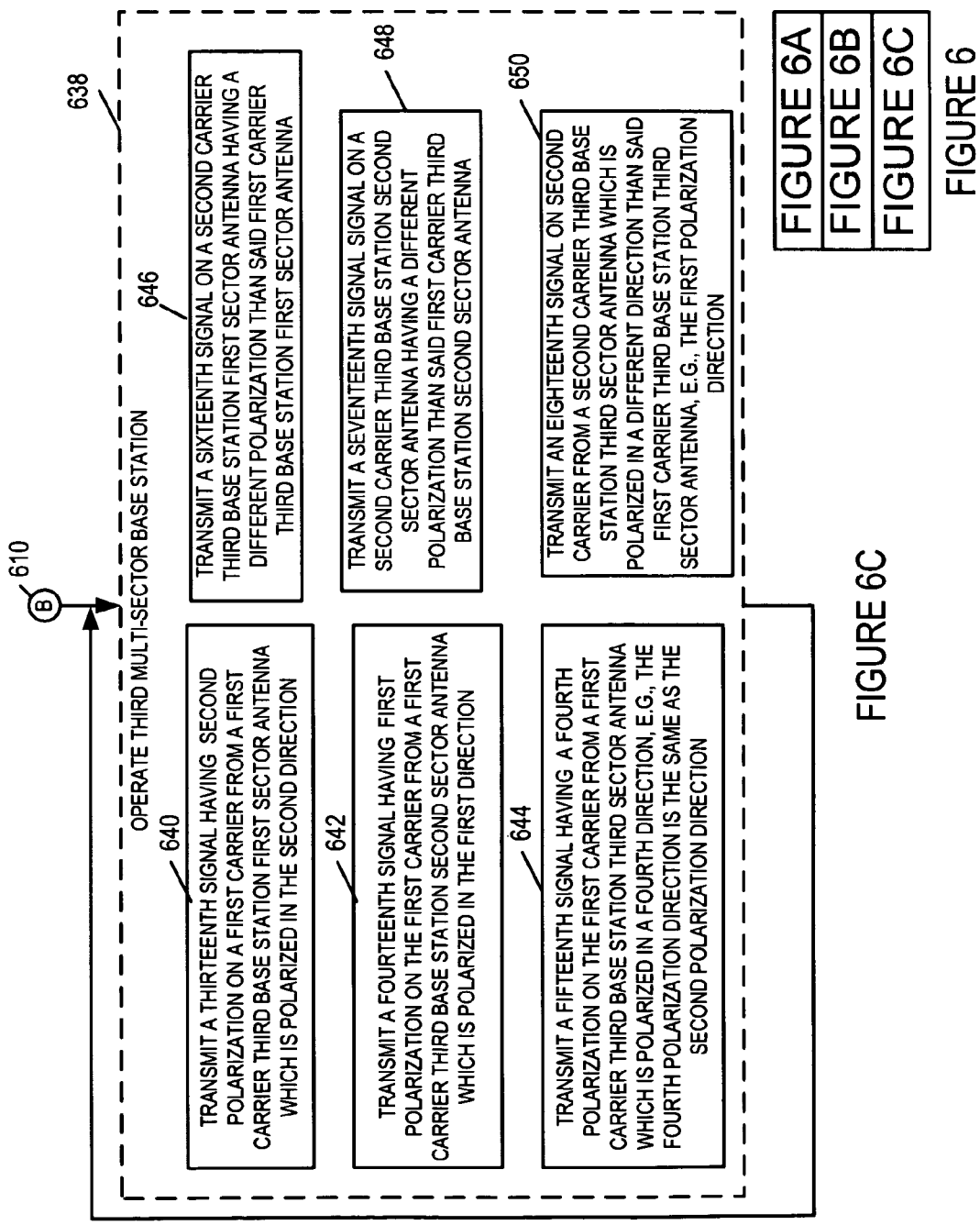

METHODS AND APPARATUS FOR USING POLARIZED ANTENNAS IN WIRELESS NETWORKS INCLUDING SINGLE SECTOR BASE STATIONS

FIELD

Various embodiments relate to wireless cellular networks, and more particularly to methods and apparatus related to deploying and/or using polarization antennas according to a configuration pattern in a cellular network to increase the spectral efficiency over the network.

BACKGROUND

In a wireless communications system, there is typically a fixed amount of air link resources available for communications. As more and more individuals start to utilize wireless services and as service providers continue to offer new and varied wireless services, the demand and competition for those limited resources continues to increase. Therefore, there is a need for new and inventive methods and apparatus to boost system capacity. In a wireless cellular communications system, interference between adjacent cells and/or sectors becomes an important consideration where bandwidth is reused in adjacent cells and/or adjacent sectors. Therefore it would be beneficial if new methods and apparatus for cellular systems used to boost system capacity also tended to address and/or minimize inter-sector and/or inter-cell interference.

It has been well understood that the use of multiple antennas in multiple-input multiple-output (MIMO) systems can increase the spectral efficiency for wireless communications. Theoretically, the capacity boost from applying multiple antennas at the base station and/or the mobile stations can be potentially a factor which is equal to the number of antennas used in the system. However, practically there are problems associated with such a system using multiple antennas. For instance, in reality such a gain in system capacity is not always attainable due to a limited scattering environment and other practical restrictions in the system. Furthermore, system complexity increases significantly in order to realize the MIMO gain. For example, for an Uplink (UL)/Downlink (DL) Space division multiple access (SDMA) scheme, more scheduling bits have to be assigned per schedule since more than one user will be assigned to the same time/frequency slab. Also, sophisticated interference cancellation schemes, e.g., a Minimum Mean Square Error (MMSE) receiver based scheme, have to be applied to the base station and/or the mobile stations since the spatial signatures of the two users on the slab will be correlated more or less. With two antennas, a traditional MIMO scheme using spatial arrays (2×2) can increase the capacity, but to a limited degree.

In view of the above discussion, it would be desirable if improved methods and apparatus could be developed to provide improved performance gain in terms of increase in system capacity, better signal to noise ratio, increased spectral efficiency over the network, and/or reduced inter cell interference. It would be advantageous if such improved methods and apparatus were able to achieve some of these goals without significantly increasing the system complexity as compared to a single antenna system.

SUMMARY

Methods and apparatus for using multiple antennas having different polarizations are described. For example, some base station antennas may be associated with a first polarization direction, e.g., the vertical polarization direction, while other base station antennas may be associated with a second polarization direction, e.g., the horizontal polarization direction. Various exemplary embodiments are directed to methods and apparatus for selectively deploying polarized antennas in a cellular network. In one embodiment, a simple approach boosts the cellular capacity without significantly increasing the complexity, as compared to a single antenna system, by utilizing polarized antennas instead of spatial antenna arrays to the system. In some embodiments, some of the sectors and/or cells utilize an antenna with a first direction polarization, while other sectors and/or cells use an antenna with a second direction polarization.

Various embodiments are directed to methods and apparatus related to base station deployment which set up and/or operate base stations in accordance with an advantageous reuse pattern from the perspective of inter-cell and/or inter-sector interference. In some embodiments a plurality of carriers are used in addition to a plurality of different polarization direction antennas. Thus various embodiments are directed to embodiments and/or deployment strategies utilizing both carrier and antenna polarization diversity. In some such embodiments, a base station is configured so that for a given sector different carriers are associated with different direction polarization antennas. Some embodiments are directed to single sector base station implementations while other embodiments are directed to multi-sector base station implementations. Still other embodiments may include a mixture of single sector and multi-sector base stations.

In some exemplary embodiments, there are two types of cells, a first type of cell having a base station configured in accordance with a first antenna polarization/frequency combination for its sectors and a second type of cell have a base station configured in accordance with a second antenna polarization/frequency combination for its sectors. In some exemplary embodiments, the mixture of cells is strategically deployed in the system such that less than half of adjacent sectors have the same polarization for a given carrier. In some exemplary embodiments, the mixture of cells is strategically deployed in a hexagonal deployment such that a given sector of a cell has at most 2 adjacent sectors which have the same antenna polarization/frequency combination.

An exemplary communications system, in accordance with some embodiments, comprises: a first base station including a first antenna assembly, said first antenna assembly including a first carrier antenna being polarized in a first direction; and a second base station, located adjacent said first base station, the second base station including a second antenna assembly, said second antenna assembly including a first carrier antenna being polarized in a second direction which is different from said first direction. An exemplary method of operating a system including first and second base stations located adjacent one another comprises: operating the first base station to transmit a first signal on a first carrier using a first first-carrier antenna polarized in a first direction, the first signal being polarized in the first direction; and operating the second base station to transit a second signal on the first carrier, using a second first-carrier antenna polarized in a second direction, the second signal being polarized in the second direction, the first and second directions being different.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION OF THE FIGURES

Figure 1:
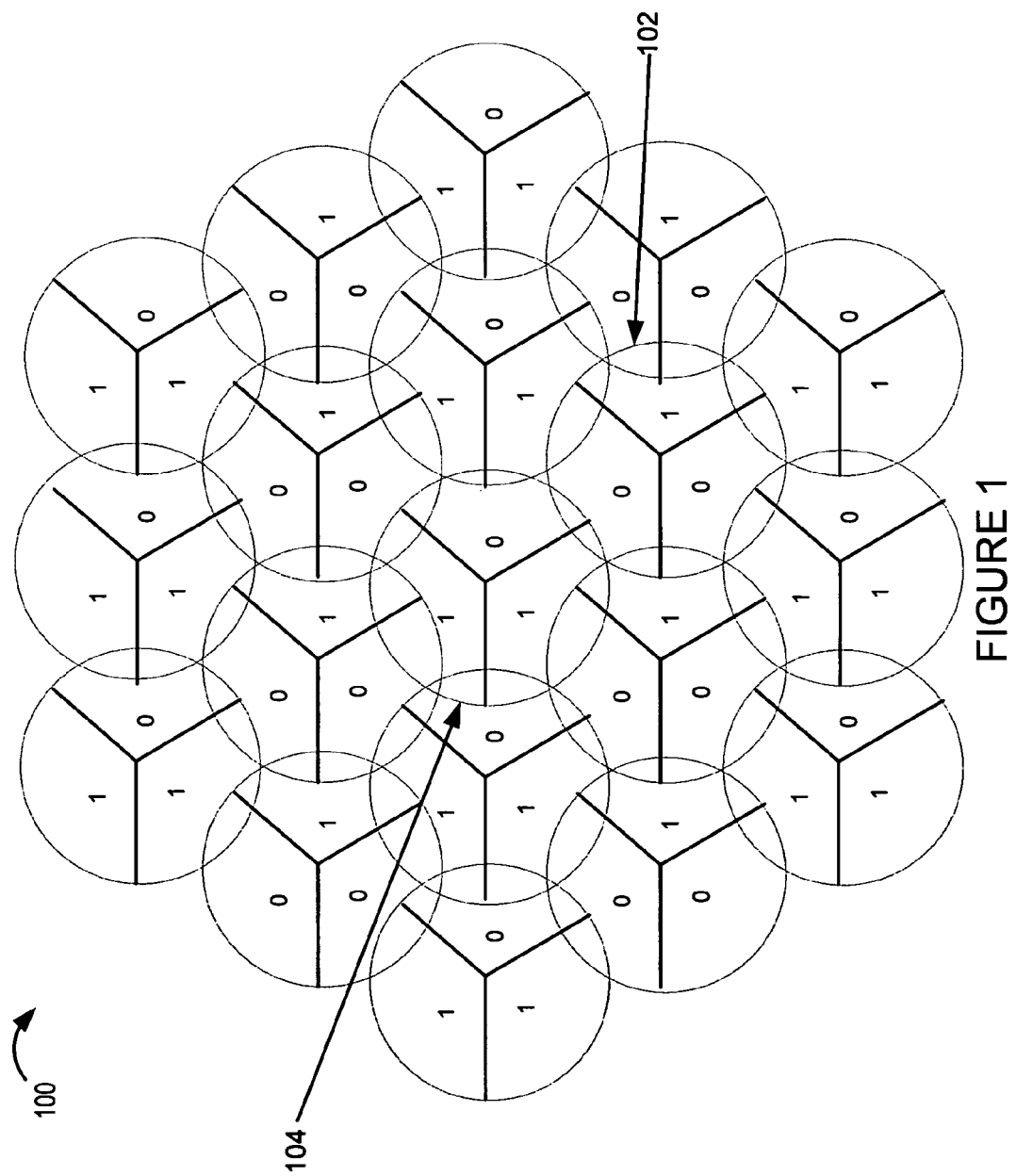
FIG. 1 illustrates an exemplary polarization reuse pattern as implemented in accordance with one exemplary embodiment.

FIG. 1 illustrates an exemplary polarization reuse pattern 100 in a sectorized hexagon deployment. In the FIG. 1 illustration, the numeral "0" signifies vertical polarization and "1" signifies horizontal polarization. In this example, there is a first type of cell, e.g., exemplary cell 102, in which two sectors of the cell use vertical polarization and the third sector uses horizontal polarization, and there is a second type of cell, e.g., cell 104, in which two sectors of the cell use horizontal polarization and the third sector uses vertical polarization. It is to be noted that the reuse pattern is designed in such a manner that for a given cell, the number of neighboring cells which use the same pattern is minimized. For regular hexagon deployment with three sectors in each cell, the structure shown in FIG. 1 is a good choice for polarization reuse. As represented in FIG. 1, each sector of a cell has up to six direct interfering neighbors. For example, a sector of exemplary cell 102 or exemplary cell 104 has six direct interfering neighboring sectors. This reuse pattern is implemented such that only two out of six neighboring sectors have the same polarization as the sector itself and thus only those two base station sector transmitters can create interference for the wireless terminals, e.g., mobiles, within the sector of interest.

Figure 2:
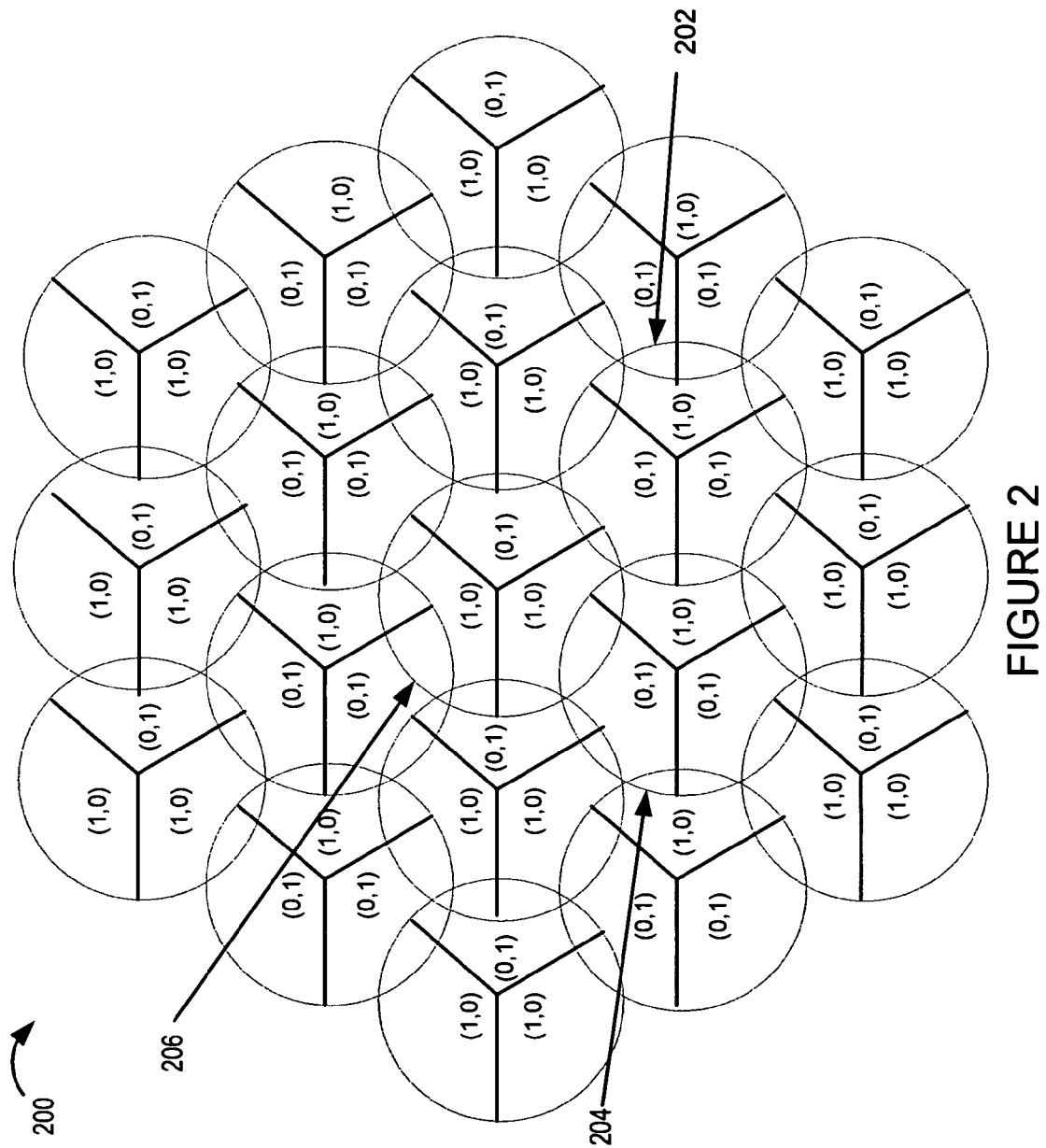
FIG. 2 illustrates another exemplary polarization reuse pattern as implemented in accordance with one exemplary embodiment.

FIG. 2 illustrates another exemplary polarization reuse pattern 200 in a sectorized hexagon deployment. In the example of FIG. 2, multiple carriers are used. In the FIG. 2 illustration, the numeral "0" signifies vertical polarization and "1" signifies horizontal polarization. For each sector there is a pair of carrier/polarization identification values. The pair (0,1) indicates that vertical polarization is used for the first carrier and horizontal polarization is used for the second carrier. The pair (1,0) indicates that horizontal polarization is used for the first carrier and vertical polarization is used for the second carrier. In this example, there is a first type of cell, e.g., exemplary cell 202 or exemplary cell 204, in which (i) two sectors of the cell use vertical polarization for the first carrier signals and use horizontal polarization for the second carrier signals, and (ii) the third sector uses horizontal polarization for the first carrier signals and vertical polarization for the second carrier signals. There is also a second type of cell, e.g., cell 206, in which (i) two sectors of the cell use horizontal polarization for the first carrier signals and use vertical polarization for the second carrier signals, and (ii) the third sector uses vertical polarization for the first carrier signals and horizontal polarization for the second carrier signals. It is to be noted that the reuse pattern is designed in such a manner that for a given cell, the number of neighboring cells which use the same pattern is minimized. Cell type selection for a given cell and orientation of one cell with respect to another cell are included as components of the designed reuse pattern. For regular hexagon deployment with three sectors in each cell and using two carriers, the structure shown in FIG. 2 is a good choice for polarization reuse. As represented in FIG. 2, each sector of a cell for each carrier has up to six direct interfering neighbors. For example, a sector of exemplary cell 202 or exemplary cell 206, with respect to a particular carrier, has six direct interfering neighboring sectors. This reuse pattern is implemented such that only two out of six neighboring sectors, corresponding to the same carrier, have the same polarization as the sector itself and thus only those two base station sector transmitters, with respect to the carrier, can create interference for the wireless terminals, e.g., mobiles, within the sector of interest with respect to that carrier.

Figure 3:
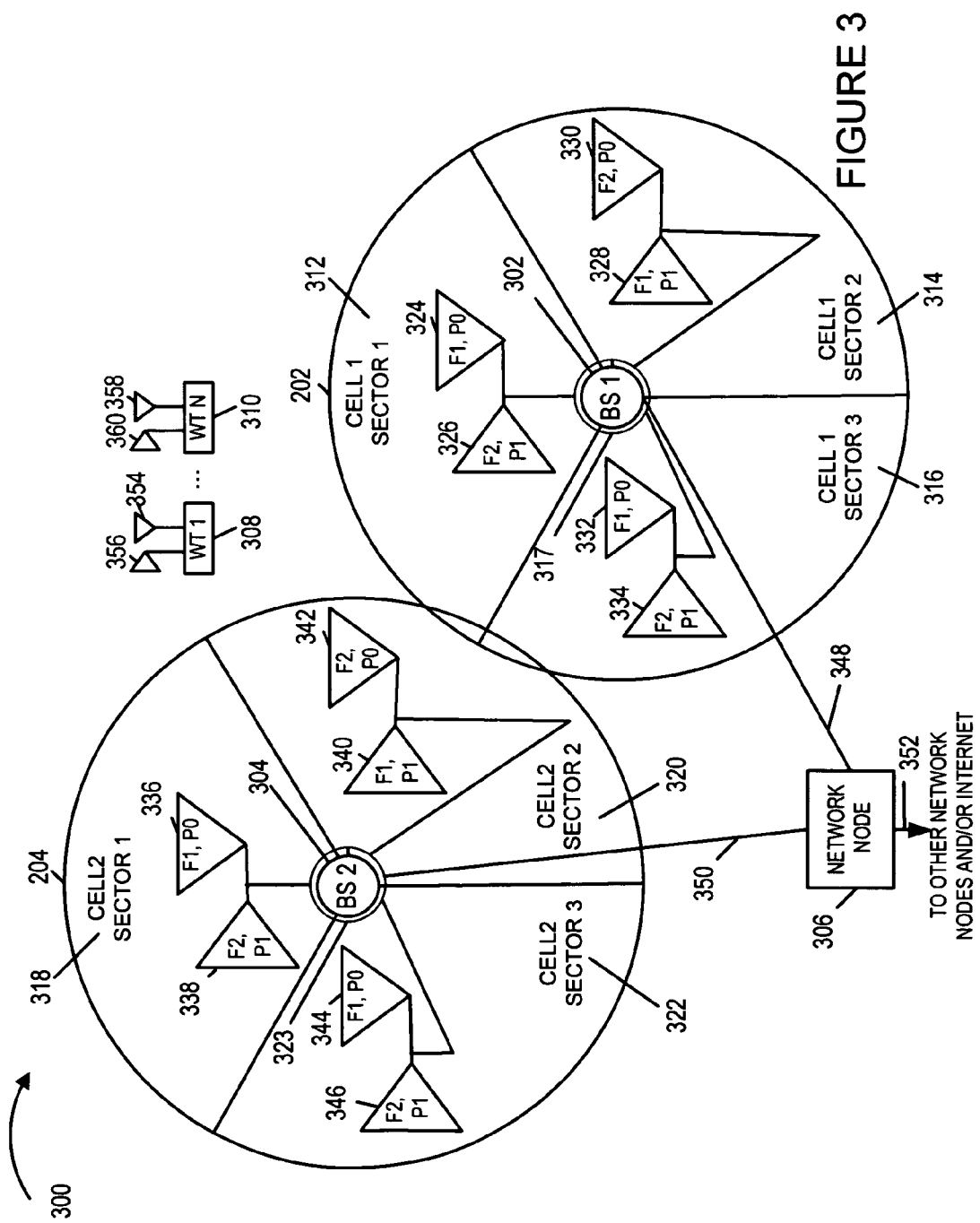
FIG. 3 illustrates a portion of an exemplary communications system including the deployment of two multi sector base stations adjacent to each other in accordance with one exemplary embodiment.

FIG. 3 is a drawing of a portion of an exemplary communications system 300 including a plurality of base stations (base station 1 302, base station 2 304), a network node 306 and a plurality of wireless terminal (WT 1 308, ..., WT N 310). Base station 1 302 has a cellular coverage area represented by cell 1 202. Similarly, base station 2 304 has a cellular coverage area represented by cell 2 204. The base stations (302, 304) are coupled to network node 306 via links (348, 350) respectively. Network node 306 is coupled to other network nodes, e.g., other base stations, AAA node, mode agent nodes, routers, system configuration nodes, etc., via link 352. Network links (348, 350, 352) are, e.g., fiber optic links.

Network node 306, by coupling different base stations to one another as part of a backhaul network, allows a wireless terminal using a first base station as its attachment point to communicate with a second wireless terminal using a second base station as its point of attachment.

In some embodiments, network node 306 is a system configuration node, e.g., providing information to the base stations (302, 304) used to configure the base station with regard to carrier/polarization information. For example, for a given sector of a base station the configuration information identifies which carrier is to be associated with the first direction polarization antenna, e.g., vertical polarization antenna, and which carrier is to be associated with the second direction polarization antenna, e.g., horizontal polarization antenna. In some embodiments, base stations are configured as part of a factory setting or local site configuration or configuration update without the need for configuration information to traverse network node 306.

Base station 1 302 is a multi-sector base station which is a three sector base station. For base station 1 302 cell 1 202 includes sector 1 312, sector 2 314 and sector 3 316. Base station 1 302 includes an antenna assembly 312. Antenna assembly 317 includes: first carrier first sector antenna 324 which is polarized in the vertical direction, second carrier first sector antenna 326 which is polarized in the horizontal direction, second sector first carrier antenna 328 which is polarized in the horizontal direction, second sector second carrier antenna 330 which is polarized in the vertical direction, third sector first carrier antenna 332 which is polarized in the vertical direction, and third sector second carrier antenna 334 which is polarized in the horizontal direction.

Base station 2 304 is also a multi-sector base station which is a three sector base station. Base station 304 is of the same type as base station 302, e.g., similar sectors have the same carrier/polarization relationship. For base station 2 304 cell 2 204 includes sector 1 318, sector 2 320 and sector 3 322. Base station 2 304 includes an antenna assembly 314. Antenna assembly 323 includes: first carrier first sector antenna 336 which is polarized in the vertical direction, second carrier first sector antenna 338 which is polarized in the horizontal direction, second sector first carrier antenna 340 which is polarized in the horizontal direction, second sector second carrier antenna 342 which is polarized in the vertical direction, third sector first carrier antenna 344 which is polarized in the vertical direction, and third sector second carrier antenna 346 which is polarized in the horizontal direction.

It should be noted that the first sector 312 of the first base station 302 is located adjacent the second sector 320 of the second base station 304 and that the first carrier first sector antenna 324 of the first base station 302 has a different polarization (vertical polarization) from the first carrier second sector antenna 340 of the second base station 304 (horizontal polarization).

In various embodiments, the system includes additional sectorized base stations and less than half of adjacent sectors have the same polarization for a given carrier.

The exemplary wireless terminals (WT 1 308, ..., WT N 310) e.g., mobile nodes, which are sometimes referred to as access terminals, include two polarization antennas. WT 1 308 includes a vertical polarization antenna 354 and a horizontal polarization antenna 356. WT N 310 includes a vertical polarization antenna 358 and a horizontal polarization antenna 360. The wireless terminal (308, 310) may move throughout the communications system and use a frequency and antenna polarization corresponding to the sector in which the wireless terminal is situated. In some embodiments, a wireless terminal may, and sometimes does, receive signals on two different carriers on two differently polarized antennas concurrently. The source of the received signals may be from the same of different sectors of the same or different base station.

Figure 4:
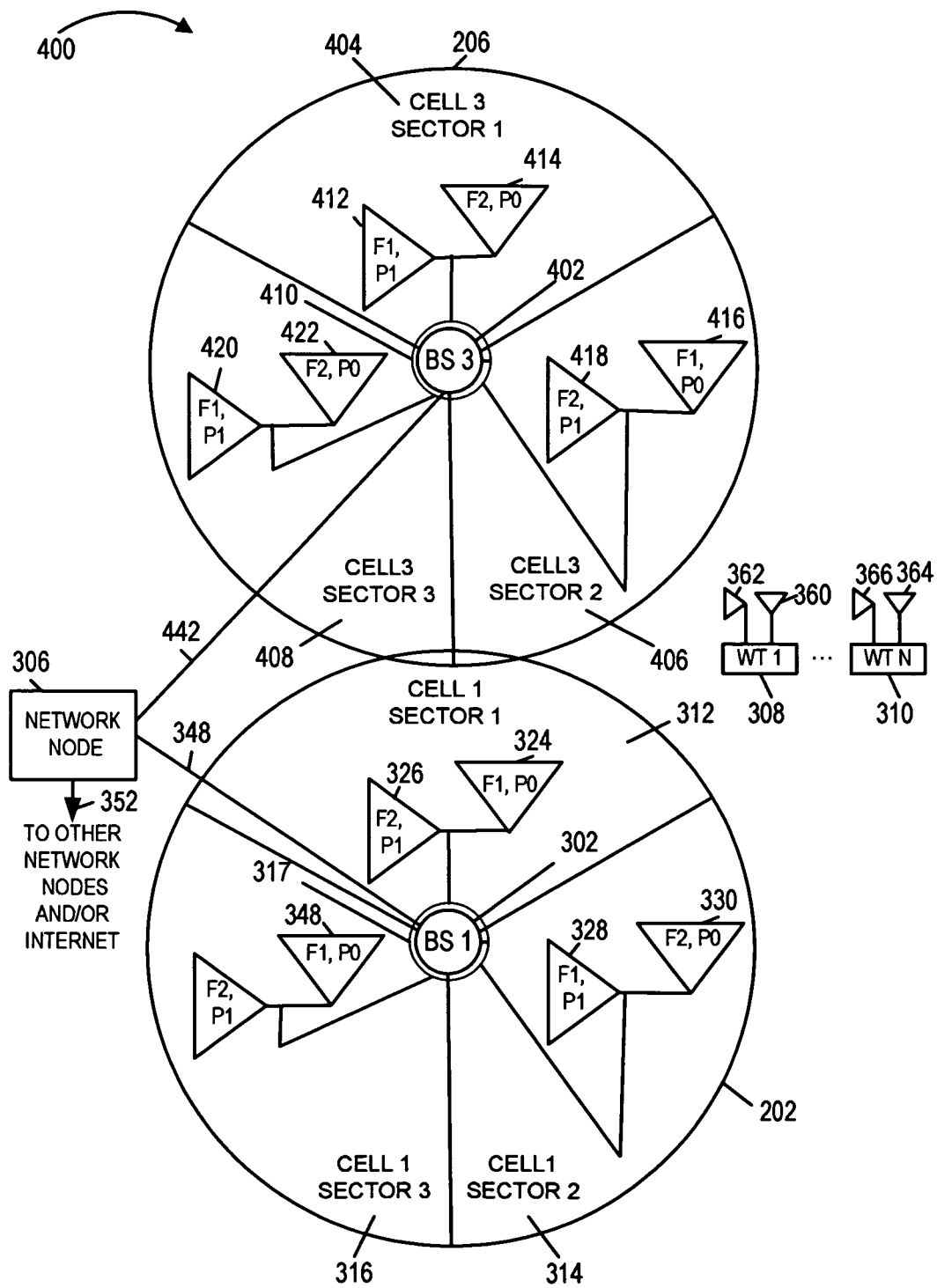
FIG. 4 illustrates a portion of an exemplary communications system including the deployment of two multi sector base stations adjacent to each other in accordance with one exemplary embodiment.

FIG. 4 is a drawing of a portion of an exemplary communications system 400 including a plurality of base stations (base station 1 302, base station 3 402), a network node 306 and a plurality of wireless terminal (WT 1 308, ..., WT N 310). Base station 1 302 has a cellular coverage area represented by cell 1 202. Similarly, base station 3 402 has a cellular coverage area represented by cell 3 206. The base stations (302, 402) are coupled to network node 306 via links (348, 442) respectively. Network node 306 is coupled to other network nodes, e.g., other base stations, AAA node, mode agent nodes, routers, system configuration nodes, etc., via link 352. Network links (348, 442, 352) are, e.g., fiber optic links.

Network node 306, base station 1 302, and WTs (308, 310) have already been described with respect to the FIG. 3 description, which is relevant. Base station 3 402 is a multi-sector base station which is a three sector base station. Base station 3 402 is of a different type than base station 1 302, e.g., similar sectors have the different carrier/polarization relationships. For base station 3 402 cell 3 206 includes sector 1 404, sector 2 406 and sector 3 408. Base station 3 402 includes an antenna assembly 410. Antenna assembly 410 includes: first carrier first sector antenna 412 which is polarized in the horizontal direction, second carrier first sector antenna 414 which is polarized in the vertical direction, second sector first carrier antenna 416 which is polarized in the vertical direction, second sector second carrier antenna 418 which is polarized in the horizontal direction, third sector first carrier antenna 420 which is polarized in the horizontal direction, and third sector second carrier antenna 422 which is polarized in the vertical direction.

It should be noted that the second and third sectors (406, 408) of the third base station 402 are located adjacent the first sector 312 of said first base station 310. In various embodiments, the system includes additional sectorized base stations and less than half of adjacent sectors have the same polarization for a given carrier.

Figure 5:
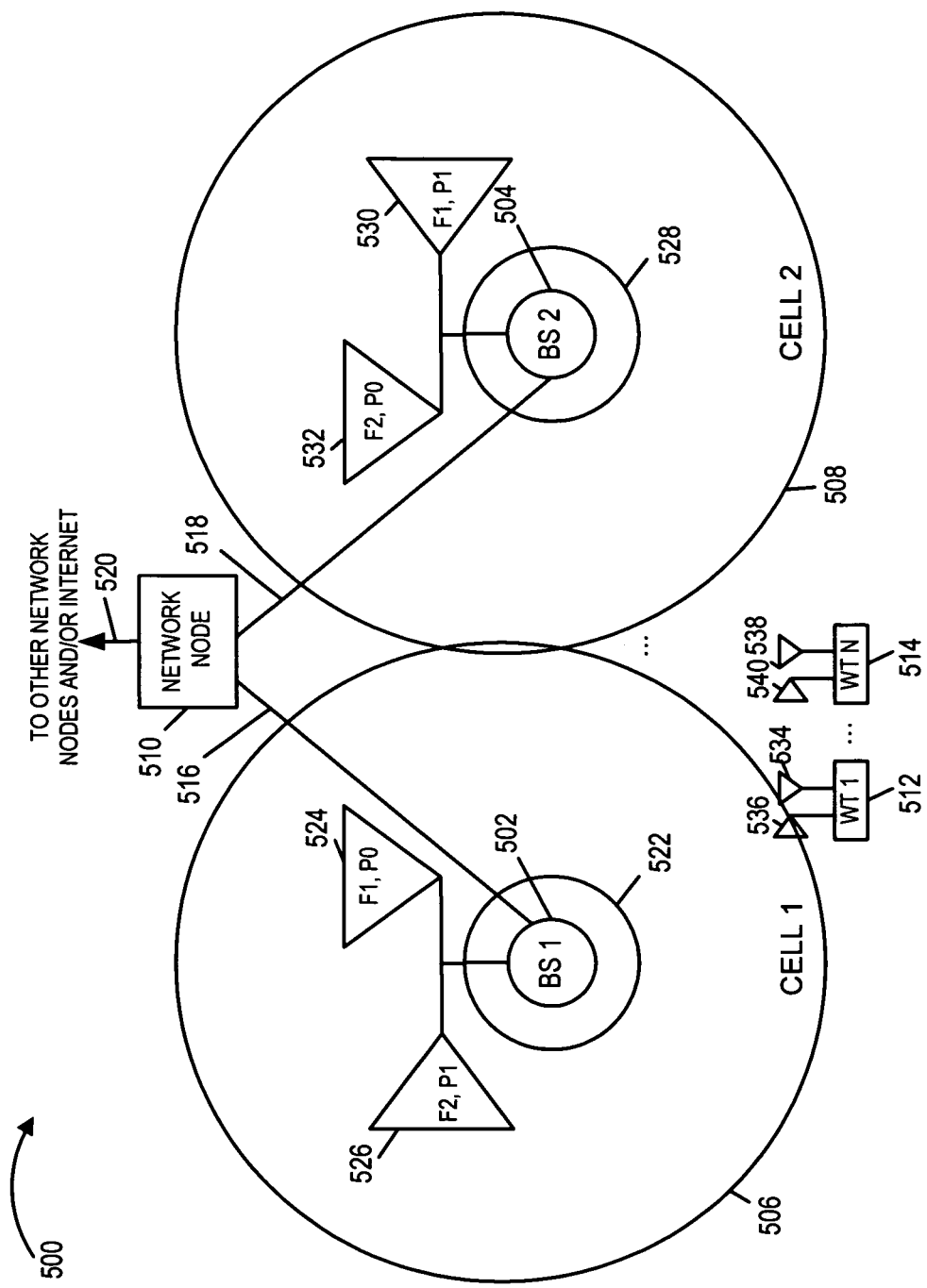
FIG. 5 illustrates an exemplary communication system including deployment of two single sector base stations adjacent to each other in accordance with one exemplary embodiment.

FIG. 5 is a drawing of an exemplary single sector base station system 500 as implemented in one exemplary embodiment. The single sector base station system 500 includes a plurality of base stations (base station 1 502, base station 2 504, ... ), network node 510 and a plurality of wireless terminals (WT 1 512, ... WT N 514). The base stations (502, 504) are coupled to network node 510 via network links (516, 518), respectively. Network node 510 is coupled to other network nodes, e.g., other base stations, routers, AAA node, home agent nodes, system configuration control nodes, etc., via network link 520. Network links (516, 518, 520) are, e.g., fiber optic links.

Network node 510 couples base stations to one another so that a wireless terminal using a first base station as a point of network attachment can communicate with a peer wireless terminal using a different base station as a point of network attachment. In some embodiments, network node 510 is a system configuration node which provides system configuration information to the base stations (502, 504), e.g., providing information used to associate a carrier frequency with a antenna polarization direction to be used in the cell of the base station. In some embodiments, the base stations (502, 504) are configured as part of the manufacturing and/or deployment process and the configuration information is, e.g., loaded locally at the base station without the need for the configuration to traverse network node 510.

Base station 1 502 has a corresponding cellular coverage area, cell 1 506, while base station 2 504 has a corresponding cellular coverage area, cell 2 508. Base station 1 502 and base station 2 504 are adjacent base stations in the system 500 and at least a portion of cell 1 506 overlaps a portion of cell 2 508.

Base station 1 502 includes a first antenna assembly 522. The first antenna assembly 522 includes a first carrier antenna 524 polarized in a first direction, e.g., the vertical polarization direction, and a second carrier antenna 526 polarized in the second direction which is different from the first direction, e.g., the horizontal polarization direction. First antenna 524 is associated with a first carrier frequency F1 and is used to carry signals using the first carrier frequency. Second antenna 526 is associated with a second carrier frequency F2 and is used to carry signals using the second carrier frequency.

Base station 2 504 includes a second antenna assembly 528. The second antenna assembly 528 includes a first carrier antenna 530 polarized in the second direction which is different from the first direction. For example, the second direction is the horizontal polarization direction and the first direction is the vertical polarization direction. The second antenna assembly 528 also includes a second carrier antenna 532 having a different polarization than the first carrier antenna 530 of the second base station. For example, the first carrier antenna 530 has horizontal polarization and the second carrier antenna 532 has vertical polarization.

Second carrier antenna 532 is associated with the second carrier frequency F2 and is used to carry signals using the second carrier frequency. First carrier antenna 530 is associated with a first carrier frequency F1 and is used to carry signals using the first carrier frequency. Thus first and second base stations (502, 504), which are single sector base stations have different relationships between antenna polarization and carrier frequency.

The first and second base stations (502, 504) are deployed such that they are geographically located adjacent to each other. However, interference is limited due to the different carrier frequency/antenna polarization relationships used.

The exemplary wireless terminals (WT 1 512, . . . , WT N 514), e.g., mobile nodes, which are sometimes referred to as access terminals, include two polarization antennas. WT 1 512 includes a vertical polarization antenna 534 and a horizontal polarization antenna 536. WT N 514 includes a vertical polarization antenna 538 and a horizontal polarization antenna 540. The wireless terminal (512, 514) may move throughout the communications system and use a frequency and antenna polarization corresponding to the sector in which the wireless terminal is situated. In some embodiments, a wireless terminal may, and sometimes does, receive signals on two different carriers on two different polarization antennas concurrently. The source of the received signals may be the same base station or different base stations.

Figure 6A:
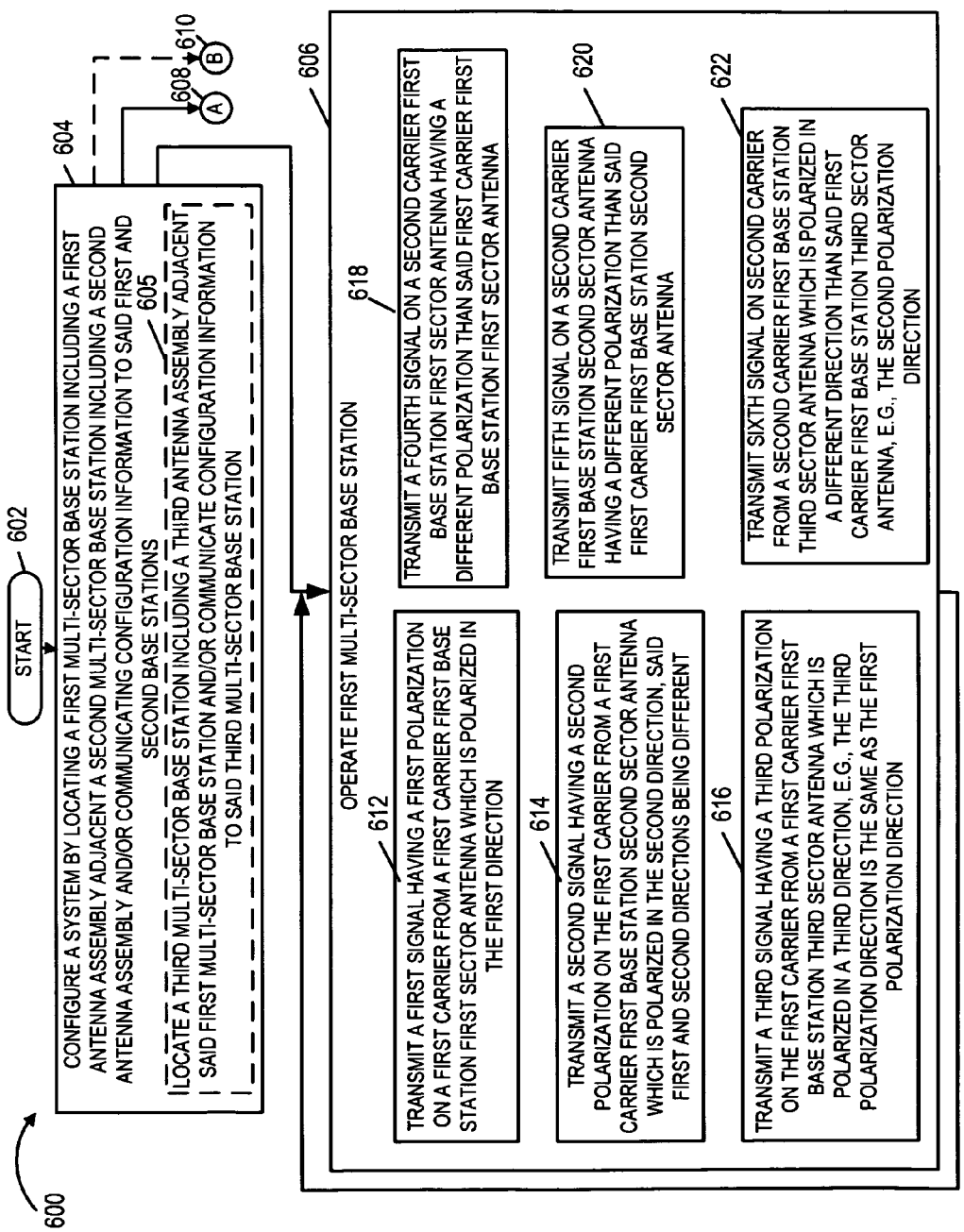
FIG. 6 illustrates a flowchart of an exemplary method to configure a system and operate first and second multi-sector base stations in accordance with an embodiment.
Figure 6B:
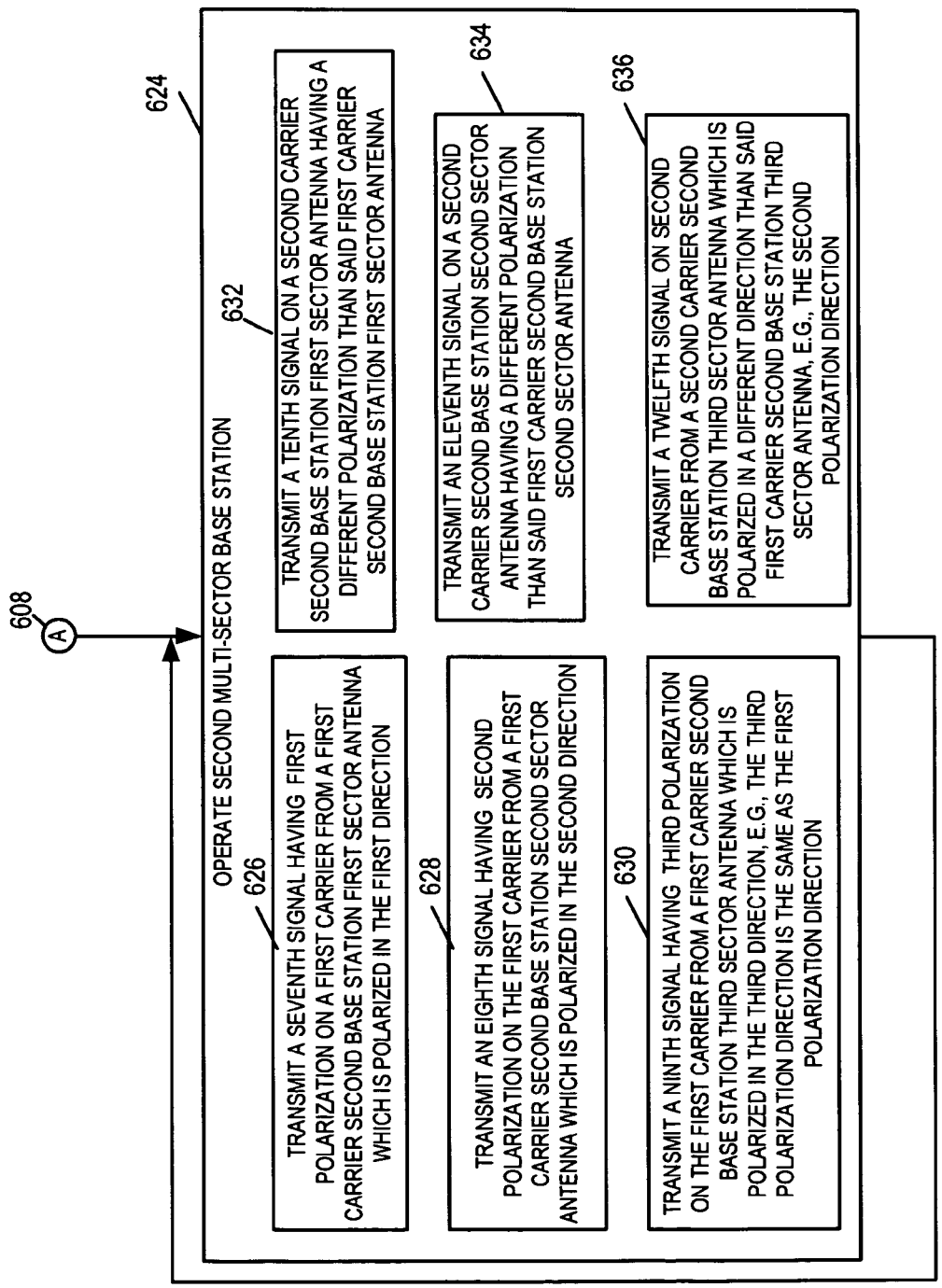

FIG. 6, comprising the combination of FIG. 6A, FIG. 6B and FIG. 6C, is a flowchart 600 of an exemplary method of configuring a system and operating exemplary multi-sector base stations in accordance with various embodiments. Operation starts in step 602, where the various base stations are powered on and proceeds to step 604. In step 604, the system is configured by locating a first multi-sector base station including a first antenna assembly adjacent a second multi-sector base station including a second multi-sector antenna assembly and/or communicating configuration information to said first and second multi-sector base stations.

In some embodiments, step 604 includes sub-step 605. In sub-step 605 a third multi-sector base station including a third antenna assembly is located adjacent said first multi-sector base station and/or configuration information is communicated to said third multi-sector base station.

One possible implementation of step 604 includes having pre-configured base stations with particular carrier frequency to antenna polarization definitions for each sector and selecting first and second base stations and locating those selected base stations to achieve a desired implementation pattern. Another possible implementation of step 604 includes loading configuration information into the individual base stations, e.g., at the factory or at the site location of the individual base station, where the configuration information is used by the base station to identify which carriers are associated with which direction polarization antennas for each sector of the base station. Still another alternative is for a network node, e.g., a system configuration control node, to communicate the configuration information to the base stations, e.g., via a backhaul network, and then the base stations use the information to configure individual sectors, e.g., associating a carrier frequency with a particular antenna polarization direction for a sector. In some embodiments, communicating configuration information includes sending a type indicator, e.g., identifying whether the base station is to follow a first frequency/polarization pattern or a second frequency polarization pattern.

In some embodiments, step 604 includes locating the first multi-sector base station adjacent the second multi-sector base station such that the first sector of the first base station is located adjacent the second sector of the second base station, and the second multi-sector base station second antenna assembly includes a first carrier first sector antenna being polarized in a first direction and a first carrier second sector antenna being polarized in the second direction, said second direction being different from the first direction, and the first carrier first sector antenna of the first base station has a different polarization than the first carrier second sector antenna of the second base station. Thus the two adjacent sectors (first sector first base station and second sector second base station) are configured to use different carriers corresponding to the same polarization antenna direction so as to reduce interference.

Operation proceeds from step 604 to step 606 and connecting node A 608. In some embodiments, e.g., an embodiment, with the third multi-sector base station, operation also proceeds from step 604 to connecting node B 610.

In step 606 the first multi-sector base station is operated to transmit signals. Step 606 includes sub-steps 612, 614, 616, 618, 620 and 622 which may be, and sometimes are, performed in parallel. In sub-step 612 the first base station transmits a first signal having a first polarization on a first carrier from a first carrier first base station first sector antenna which is polarized in the first direction. In sub-step 614, the first multi-sector base station transmits a second signal having a second polarization on the first carrier from a first base station second sector antenna which in polarized in the second direction, said first and second directions being different. In sub-step 616, the first multi-sector base station transmits a third signal having a third polarization on the first carrier from a first carrier first base station third sector antenna which is polarized in a third direction, e.g., the third polarization direction being the same as the first polarization direction. In sub-step 618, the first multi-sector base station transmits a fourth signal on a second carrier first base station first sector antenna having a different polarization than said first carrier first base station first sector antenna. In sub-step 620, the first multi-sector base station transmits a fifth signal on a second carrier first base station second sector antenna having a different polarization than said first carrier first base station second sector antenna. In sub-step 622, the first multi-sector base station transmits a sixth signal on a second carrier from a second carrier first base station third sector antenna which is polarized in a different direction than said first carrier first base station third sector antenna, e.g., the second polarization direction. Operation proceeds from the output of step 606 back to the input of step 606.

Returning to connecting node A 608, operation proceeds from connecting node A 608 to step 624. In step 624, the second multi-sector base station is operated to transmit signals. Step 624 includes sub-steps 626, 628, 630, 632, 634 and 636 which may be, and sometimes are, performed in parallel. In sub-step 626 the second base station transmits a seventh signal having first polarization on a first carrier from a first carrier second base station first sector antenna which is polarized in the first direction. In sub-step 628, the second multi-sector base station transmits an eighth signal having second polarization on the first carrier from a first carrier second base station second sector antenna which in polarized in the second direction. In sub-step 630, the second multi-sector base station transmits a ninth signal having third polarization on the first carrier from a first carrier second base station third sector antenna which is polarized in the third direction, e.g., the third polarization direction being the same as the first polarization direction. In sub-step 632, the second multi-sector base station transmits a tenth signal on a second carrier second base station first sector antenna having a different polarization than said first carrier second base station first sector antenna. In sub-step 634, the second multi-sector base station transmits an eleventh signal on a second carrier second base station second sector antenna having a different polarization than said first carrier second base station second sector antenna. In sub-step 636, the second multi-sector base station transmits a twelfth signal on a second carrier from a second carrier second base station third sector antenna which is polarized in a different direction than said first carrier second base station third sector antenna, e.g., the second polarization direction. Operation proceeds from the output of step 624 back to the input of step 624.

Returning to connecting node B 610, operation proceeds from connecting node B 610 to step 638. In step 638, the third multi-sector base station is operated to transmit signals. Step 638 includes sub-steps 640, 642, 644, 646, 648 and 650 which may be, and sometimes are, performed in parallel. In sub-step 640 the third base station transmits a thirteenth signal having second polarization on a first carrier from a first carrier third base station first sector antenna which is polarized in the second direction. In sub-step 642, the third multi-sector base station transmits a fourteenth signal having first polarization on the first carrier from a third base station second sector antenna which in polarized in the first direction. In sub-step 644, the third multi-sector base station transmits a fifteenth signal having fourth polarization on the first carrier from a first carrier third base station third sector antenna which is polarized in the fourth direction, e.g., the fourth polarization direction being the same as the second polarization direction. In sub-step 646, the third multi-sector base station transmits a sixteenth signal on a second carrier third base station first sector antenna having a different polarization than said first carrier third base station first sector antenna. In sub-step 648, the third multi-sector base station transmits a seventeenth signal on a second carrier third base station second sector antenna having a different polarization than said first carrier third base station second sector antenna. In sub-step 650, the third multi-sector base station transmits an eighteenth signal from a second carrier third base station third sector antenna which is polarized in a different direction than said first carrier third base station third sector antenna, e.g., the first polarization direction. Operation proceeds from the output of step 638 back to the input of step 638.

In one exemplary embodiment corresponding to FIG. 6, the first multi-sector base station is base station 1 302 of FIG. 3 or FIG. 4 and corresponds to cell 202 of FIG. 2, the second multi-sector base station is base station 2 304 of FIG. 3 and corresponds to cell 204 of FIG. 2, and the third multi-sector base station is base station 3 402 of FIG. 4 and corresponds to cell 206 of FIG. 2. In addition, the first polarization direction is the vertical polarization direction and the second polarization direction is the horizontal polarization direction. Continuing with the example, the (first, second, third, fourth, fifth, sixth, seventh, eighth, ninth, tenth, eleventh, twelfth, thirteenth, fourteenth, fifteenth, sixteenth, seventeenth, eighteenth) signals are transmitted via antennas (324, 328, 332, 326, 330, 334, 336, 340, 344, 338, 342, 346, 412, 416, 420, 414, 418, 422), respectively.

Figure 7:
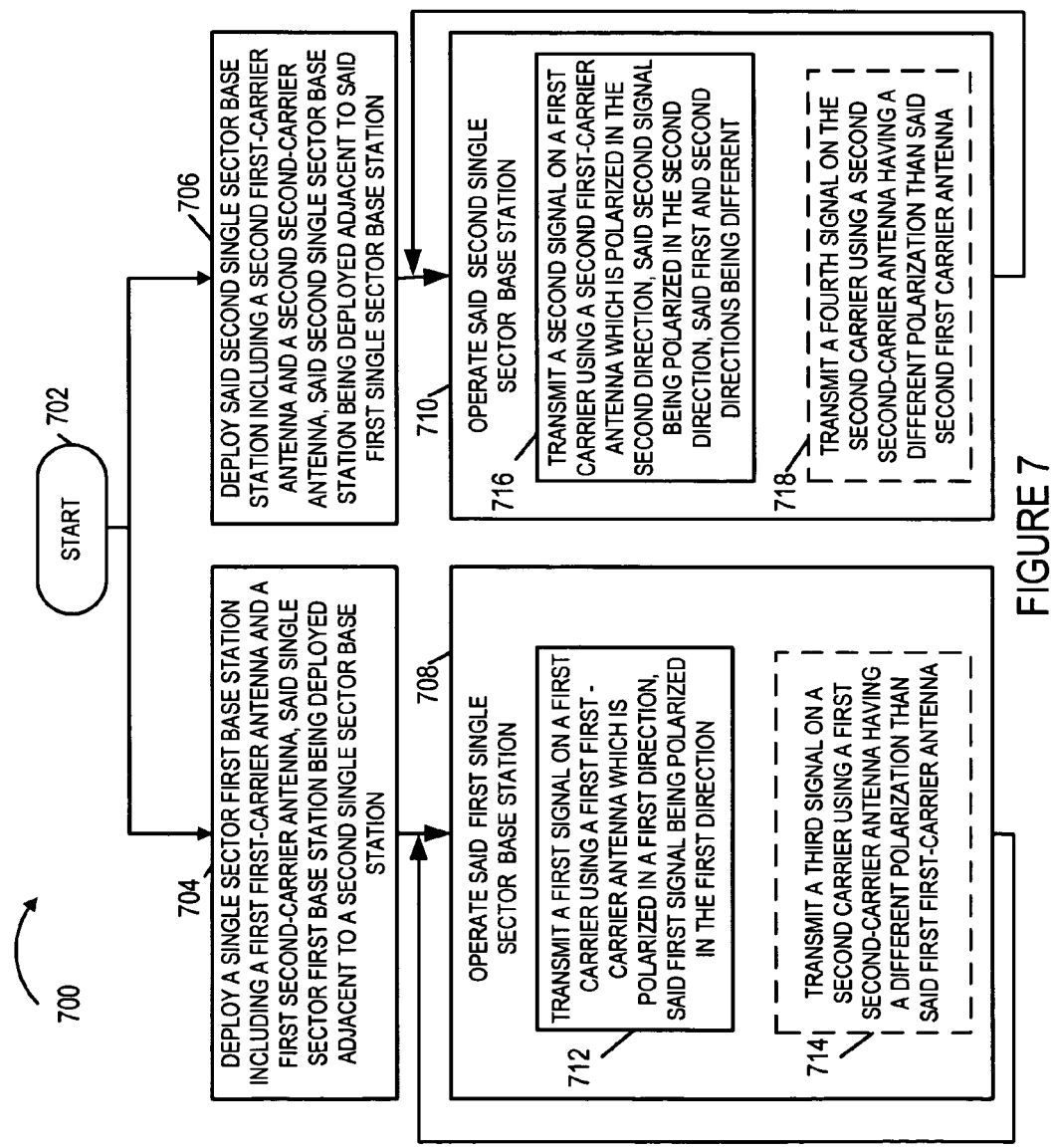
FIG. 7 illustrates a flowchart showing the steps of an exemplary method of deploying single sector base stations and operating first and second single sector base stations in accordance with yet another embodiment.

FIG. 7 is a flowchart 700 of an exemplary method of operating a system including first and second base stations. Operation starts in start step 702 and proceeds to steps 704 and 706. In step 704, a single sector first base station including a first first-carrier antenna and a first second-carrier antenna is deployed, said single sector first base station being deployed adjacent to a second single sector base station. In step 706, the second single sector base station including a second first-carrier antenna and a second second-carrier antenna is deployed. The second single sector base station is deployed adjacent to said first single sector base station.

In some embodiments, the deployment of steps 704 and steps 706 includes physically placing pre-configured base stations at sites which are physically adjacent. In some embodiments, the deployment of steps 704 and step 706 includes communicating configuration information from a system configuration control node, e.g., via a backhaul, to the base stations. The system configuration information includes, e.g., information associating carriers with polarization antennas for the base station. In some embodiments, deployment includes loading configuration information into a base station directly at a site, e.g., without traversing the backhaul.

Operation proceeds from step 704 to step 708 and from step 706 to step 710. In step 708, the first single sector base station is operated to transmit signals. Step 708 includes sub-step 712, and in some embodiments sub-step 714. In sub-step 712, the first base station transmits a first signal on a first carrier using a first first-carrier antenna which is polarized in a first direction, said first signal being polarized in the first direction. In sub-step 714, the first base station transmits a third signal on a second carrier using a first second-carrier antenna having a different polarization than said first first-carrier antenna.

In step 710, the second single sector base station is operated to transmit signals. Step 710 includes sub-step 716 and, in some embodiments, sub-step 718. In sub-step 716 the second base station transmits a second signal on a first carrier using a second first-carrier antenna which is polarized in the second direction, said second signal being polarized in the second direction, the first and second direction being different. In sub-step 718, the second base station transmits a fourth signal on the second carrier using a second second-carrier antenna having a different polarization than said second first-carrier antenna.

Sub-steps 712, 714, 716, 718 can be, and sometimes are, performed in parallel. Operation proceeds from the output of step 708 to the input of step 708. Similarly for the second base station, operation proceeds from the output of step 710 to the input of step 710.

In various embodiments, the first direction is a vertical direction and the second direction is a horizontal direction. In some embodiments, the first first-carrier antenna is vertically polarized and the second first-carrier antenna is horizontally polarized. In some such embodiments, the second first-carrier antenna is horizontally polarized and the second-second carrier antenna is vertically polarized.

In one exemplary embodiment, the method of flowchart 700 is implemented by the exemplary system 500 of FIG. 5. Continuing with the example, the first single sector base station is BS 1 502, the second single sector base station is BS 2 504, the first first-carrier antenna is antenna 524 which is vertically polarized, the first second-carrier antenna is antenna 526 which is horizontally polarized, the second first-carrier antenna is antenna 530 which is horizontally polarized, and the second second-carrier antenna is antenna 532 which is vertically polarized.

Figure 8:
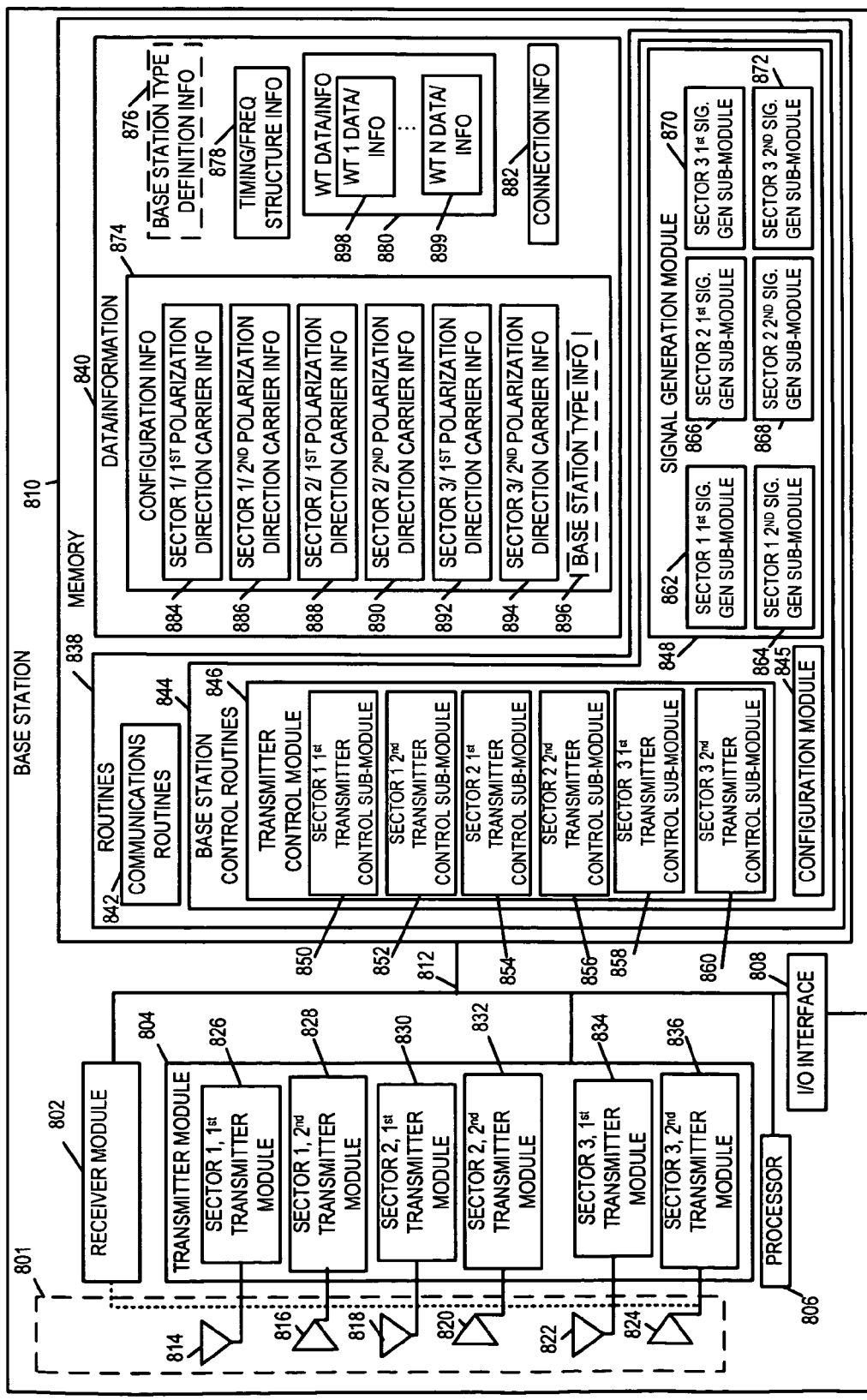
FIG. 8 is a drawing of an exemplary base station in accordance with various embodiments.

FIG. 8 is a drawing of an exemplary base station 800 in accordance with various embodiments. Exemplary base station is, e.g., one of the base stations of FIG. 3 or FIG. 4. Exemplary base station 800 includes a receiver module 802, a transmitter module 804, processor 806, an I/O interface 808, and a memory 810 coupled together via a bus 812 through which the various elements may interchange data and information. Base station 800 also includes an antenna assembly 801 including a sector 1 $1^{st}$ polarization direction antenna 814, a sector 1 $2^{nd}$ polarization direction antenna 816, a sector 2 $1^{st}$ polarization direction antenna 818, a sector 2 $2^{nd}$ polarization direction antenna 820, a sector 3 $1^{st}$ polarization direction antenna 822 and a sector 3 $2^{nd}$ polarization direction antenna 824. In some embodiments, the first polarization direction is a vertical polarization direction and the second polarization direction is a horizontal polarization direction.

Transmitter module 804 includes: a sector 1 $1^{st}$ transmitter module 826 coupled to sector 1 $1^{st}$ polarization direction antenna 814, a sector 1 $2^{nd}$ transmitter module 828 coupled to sector 1 $2^{nd}$ polarization direction antenna 816, a sector 2 $1^{st}$ transmitter module 830 coupled to sector 2 $1^{st}$ polarization direction antenna 818, a sector 2 $2^{nd}$ transmitter module 832 coupled to sector 2 second polarization direction antenna 820, a sector 3 $1^{st}$ transmitter module 834 coupled to sector 3 $1^{st}$ polarization direction antenna 822, and a sector 3 $2^{nd}$ transmitter module 836 coupled to sector 3 second polarization direction antenna 824.

I/O interface 808 couples the base station 800 to other network nodes, e.g., other base stations, routers, AAA nodes, home agent nodes, system configuration control nodes, and/or the Internet. I/O interface 808 allows a wireless terminal using a base station 800 attachment point to communicate with a peer wireless terminal using an attachment point of a different base station. In some embodiments, base station configuration information, e.g., information identifying a base station type and/or information identifying carriers associated with particular polarization directions for particular sectors of the base station 800, is communicated to base station 800 via I/O interface 808, e.g., from a system configuration control node which is establishing a reuse pattern in the system.

Memory 810 includes routines 838 and data/information 840. The processor 806, e.g., a CPU, executes the routines 838 and uses the data/information 840 in memory 810 to control the operation of the base station 800 and implement methods, e.g., the method of flowchart 600 of FIG. 6 pertaining to one of the base stations. Routines 838 include communications routines 842 and base station control routines 844. The communications routines 842 implement the various communications protocols used by the base station 800. The base station control routines 844 include a configuration module 845, a transmitter control module 846 and a signal generation module 848. The configuration module 845 is used to load configuration information and/or implement a stored configuration corresponding to the base station 800. Transmitter control module 846 includes a plurality of transmitter control modules (sector 1 $1^{st}$ transmitter control sub-module 850, sector 1 $2^{nd}$ transmitter control sub-module 852, sector 2 $1^{st}$ transmitter control sub-module 854, sector 2 $2^{nd}$ transmitter control sub-module 856, sector 3 $1^{st}$ transmitter control sub-module 858, sector 3 $2^{nd}$ transmitter control sub-module 860) corresponding to the transmitter modules (826, 828, 830, 832, 834, 836), respectively. Signal generation module 848 includes a plurality of signal generation sub-modules (sector 1 $1^{st}$ signal generation sub-module 862, sector 1 $2^{nd}$ signal generation sub-module 864, sector 2 $1^{st}$ signal generation sub-module 866, sector 2 $2^{nd}$ signal generation sub-module 868, sector 3 $1^{st}$ signal generation sub-module 870, sector 3 $2^{nd}$ signal generation sub-module 872) corresponding to the transmitter modules (826, 828, 830, 832, 834, 836), respectively.

Sector 1 $1^{st}$ transmitter module 826 transmits signal over first sector $1^{st}$ polarization direction antenna 814 under the control of sector 1 $1^{st}$ transmitter control sub-module 850, wherein the sector 1 $1^{st}$ signal generator sub-module 862 generates signals which are input to the sector $1^{st}$ transmitter module 826. The transmitted signals from sector 1 $1^{st}$ transmitter module 826 use the carrier identified by sector $1/1^{st}$ polarization direction carrier information 884.

Sector 1 $2^{nd}$ transmitter module 828 transmits signal over first sector $2^{nd}$ polarization direction antenna 816 under the control of sector 1 $2^{nd}$ transmitter control sub-module 852, wherein the sector 1 $2^{nd}$ signal generator sub-module 864 generates signals which are input to the sector 1 $2^{nd}$ transmitter module 828. The transmitted signals from sector 1 $2^{nd}$ transmitter module 828 use the carrier identified by sector $1/2^{nd}$ polarization direction carrier information 886.

Sector 2 $1^{st}$ transmitter module 830 transmits signal over second sector $1^{st}$ polarization direction antenna 818 under the control of sector 2 $1^{st}$ transmitter control sub-module 854, wherein the sector 2 $1^{st}$ signal generator sub-module 866 generates signals which are input to the sector 2 $1^{st}$ transmitter module 830. The transmitted signals from sector 2 $1^{st}$ transmitter module 830 use the carrier identified by sector $2/1^{st}$ polarization direction carrier information 888.

Sector 2 $2^{nd}$ transmitter module 832 transmits signal over second sector $2^{nd}$ polarization direction antenna 820 under the control of sector 2 $2^{nd}$ transmitter control sub-module 856, wherein the sector 2 $2^{nd}$ signal generator sub-module 868 generates signals which are input to the sector 2 $2^{nd}$ transmitter module 832. The transmitted signals from sector 2 $2^{nd}$ transmitter module 832 use the carrier identified by sector $2/2^{nd}$ polarization direction carrier information 890.

Sector 3 $1^{st}$ transmitter module 834 transmits signal over third sector $1^{st}$ polarization direction antenna 822 under the control of sector 3 $1^{st}$ transmitter control sub-module 858, wherein the sector 3 $1^{st}$ signal generator sub-module 870 generates signals which are input to the sector 3 $1^{st}$ transmitter module 834. The transmitted signals from sector 3 $1^{st}$ transmitter module 834 use the carrier identified by sector $3/1^{st}$ polarization direction carrier information 892.

Sector 3 $2^{nd}$ transmitter module 836 transmits signal over third sector $2^{nd}$ polarization direction antenna 824 under the control of sector 3 $2^{nd}$ transmitter control sub-module 860, wherein the sector 3 $2^{nd}$ signal generator sub-module 872 generates signals which are input to the sector 3 $2^{nd}$ transmitter module 836. The transmitted signals from sector 3 $2^{nd}$ transmitter module 836 use the carrier identified by sector $3/2^{nd}$ polarization direction carrier information 894.

Various alternatives to using the configuration carrier information are possible. For example, as part of the configuration process, the configuration module 845 can use the carrier information to set each of the individual transmitter modules corresponding to an antenna for a particular sector which has a particular polarization direction to a particular carrier. As another possibility a transmitter control sub-module corresponding to a particular transmitter module/antenna can control the transmitter to use the carrier identified in configuration information for the sector/antenna polarization combination. As still another possibility, the signal generation sub-module for a particular sector and antenna can control the generated signal to use the carrier specified in the configuration information.

Data/information 840 includes configuration information 874, timing/frequency structure information 878, wireless terminal data/information 880 and connection information 882. In some embodiments data/information 840 includes base station type definition information. Configuration information 874 includes information identifying the carrier to be used for each sector/antenna polarization combination (sector $1/1^{st}$ polarization direction carrier information 884, sector $1/2^{nd}$ polarization direction carrier information 886, sector $2/1^{st}$ polarization direction carrier information 888, sector $2/2^{nd}$ polarization direction carrier information 890, sector 3/1$^{st}$ polarization direction carrier information 892, sector 3/2$^{nd}$ polarization direction carrier information 894). In some embodiments, the configuration information 874 includes base station type information 896.

Base station type information 896 identifies the type of base station to which base station 800 is to be configured from among a plurality of base station types specified in base station type definition information. For example, a first base station type may be a base station such as BS 1 302 of FIG. 4 and a second base station type may be a base station such as BS 3 402 of FIG. 4, wherein each base station type has a set of predetermined associations between polarization direction antennas and carriers for each sector of the base station.

Timing frequency structure information 878 includes information identifying a downlink timing structure and an uplink timing structure including recurring patterns, carrier frequencies used, tone block information associated with carrier frequencies, number of tones used, symbol timing information, etc.

WT data information 880 includes sets of information corresponding to various wireless terminals using base station 800 as a point of attachment (WT 1 data/information 898, . . . , WT N data/information 899). Connection information 882 includes information identifying ongoing wireless links including information identifying the sector, polarization antenna and carrier being used for a given connection. Some wireless terminals can have multiple concurrent connections with base station 800, and the connections can be to the same sector or to different, e.g., adjacent, sectors. For example, a wireless terminal can have a first connection using a first direction polarization antenna, e.g., a vertical direction polarization antenna, and can have a second connection using a second direction polarization antenna, e.g., a horizontal direction polarization antenna.

In various embodiments, the 1$^{st}$ polarization direction is a vertical polarization direction and the second polarization direction is a horizontal polarization direction. In some embodiments, two different carriers are used in each sector, e.g. F1 and F2, and for a given sector one of the carriers is associated with a first polarization direction antenna and the other one of the carriers is associated with the second polarization direction antenna.

Base station 800 is an example of a three sector base station; however, other similar base station may have a different number of sectors, e.g., one, two or more than three sectors. A variation of base station 800 which is a single sector base station is, e.g., base station 502 or base station 504 of FIG. 5 or a base station which implements a portion of the method of flowchart 700 of FIG. 7.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, transmitting a first signal on a first carrier from a first carrier first sector antenna which is polarized in a first direction, transmitting a second signal having a second polarization on the first carrier from a first carrier second sector antenna which is polarized in a second direction, generating a first signal, generating a second signal, locating base stations in a system, communicating configuration information and/or implementing a configuration. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Some embodiments are directed to a device, e.g., communications device, including a processor configured to implement one, multiple or all of the steps of one or more methods of the invention. In some embodiments, the processor or processors, e.g., CPUs, of one or more devices, e.g., communications devices such as base stations are configured to perform the steps of the methods described as being as being performed. Accordingly, some, but not all embodiments are directed to a device, e.g., communications device, with a processor which includes a module corresponding to each of the steps of the various described methods performed by the device in which the processor is included. In some but not all embodiments a device, e.g., a communications device, includes a module corresponding to each of the steps of the various described methods performed by the device in which the processor is included. The modules may be implemented using software and/or hardware.

While described in the context of an OFDM system, at least some of the methods and apparatus of various embodiments, are applicable to a wide range of communications systems including many non-OFDM and/or non-cellular systems. Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A first base station, comprising:
a first sector of the first base station including a first antenna assembly, said first antenna assembly including a first carrier antenna polarized in a first direction, said first sector of the first base station being oriented in a third direction;
wherein said first sector of the first base station is located adjacent a second base station, said second base station being at a location which is in said third direction relative to said first base station, the second base station including a second base station sector oriented in said third direction, said second base station sector including a second antenna assembly, said second antenna assembly including a first carrier antenna polarized in a second direction which is different from said first direction;

said first base station further including a second sector of the first base station, said second sector of the first base sector being oriented in a fourth direction which is different from said third direction, said second sector of the first base station including a first carrier antenna polarized in the second direction; and wherein said first base station is located adjacent a third base station, said third base station being at a location which is in said fourth direction relative to said first base station, the third base station including a third base station sector oriented in said fourth direction, said third base station sector including a first carrier antenna polarized in the second direction.

2. The first base station of claim 1, wherein said first carrier antenna of the first base station is vertically polarized and wherein said first carrier antenna of the second base station is horizontally polarized.

3. The first base station of claim 1, wherein said first antenna assembly of the first base station further includes a second carrier antenna having a different polarization than said first carrier antenna of the first base station.

4. The first base station of claim 3, wherein said second antenna assembly of the second base station further includes a second carrier antenna having a different polarization than said first carrier antenna of the second base station.

5. The first base station of claim 4, wherein said first carrier antenna of the first base station is vertically polarized and wherein said first carrier antenna of the second base station is horizontally polarized.

6. The first base station of claim 5, wherein said second carrier antenna of the first base station is horizontally polarized and wherein said second carrier antenna of the second base station is vertically polarized.

7. The first base station of claim 2, wherein said first, second, and third base stations are multi-sector base stations including an odd number of sectors.

8. A method of operating a first base station, the method comprising;

operating a first sector of said first base station to transmit a first signal on a first carrier using a first first-carrier antenna polarized in a first direction, said first sector of the first base station being oriented in a third direction and including said first first-carrier antenna;

wherein operating the first sector of the first base station to transmit said first signal is performed while said first sector of the first base station is adjacent a second base station, said second base station being at a location which is in said third direction relative to said first base station, the second base station including a second base station sector oriented in said third direction which transmits on the first carrier using a second first-carrier antenna polarized in a second direction, the first and second directions being different;

wherein said first base station further includes a second sector of the first base station, said second sector of the first base sector being oriented in a fourth direction which is different from said third direction, said second sector of the first base station including a first carrier antenna polarized in the second direction; and wherein said first base station is located adjacent a third base station, said third base station being at a location which is in said fourth direction relative to said first base station, the third base station including a third base station sector oriented in said fourth direction, said third base station sector including a first carrier antenna polarized in the second direction.

9. The method of claim 8, wherein said first direction is a vertical direction and wherein said second direction is a horizontal direction.

10. The method of claim 8, further comprising:

operating the first sector of the first base station to transmit a second signal on a second carrier using a first second-carrier antenna having a different polarization than said first first-carrier antenna.

11. The method of claim 10, wherein the second base station sector transmits on the second carrier using a second second-carrier antenna having a different polarization than said second first-carrier antenna.

12. The method of claim 11, wherein said first first-carrier antenna is vertically polarized and wherein said second first-carrier antenna is horizontally polarized.

13. The method of claim 12, wherein said first second-carrier antenna is horizontally polarized and wherein said second second-carrier antenna is vertically polarized.

14. The method of claim 9, wherein said first, second, and third base stations are multi-sector base stations including an odd number of sectors.

15. A first base station comprising:

a first sector of the first base station, said first sector of the first base station including means for transmitting a first signal, polarized in a first direction, on a first carrier, said first sector of the first base station being oriented in a third direction;

wherein said first sector of the first base station is located adjacent a second base station, said second base station being at a location which is in said third direction relative to said first base station, said second base station including a second base station sector oriented in said third direction that includes means for transmitting a second signal polarized in a second direction, the first and second directions being different;

wherein said first base station further includes a second sector of the first base station, said second sector of the first base sector being oriented in a fourth direction which is different from said third direction, said second sector of the first base station including means for transmitting a signal, on the first carrier, polarized in the second direction; and wherein said first base station is located adjacent a third base station, said third base station being at a location which is in said fourth direction relative to said first base station, the third base station including a third base station sector oriented in said fourth direction, said third base station sector including means for transmitting a signal, on the first carrier, polarized in the second direction.

16. The first base station of claim 15, wherein said first direction is a vertical direction and wherein said second direction is a horizontal direction.

17. The first base station of claim 15, wherein the first base station further comprises:

means for transmitting a third signal on a second carrier having a different polarization than said first signal.

18. A non-transitory computer readable medium embodying machine executable instructions for controlling a first base station to implement a method, the method comprising:

operating a first sector of the first base station to transmit a first signal on a first carrier using a first first-carrier antenna polarized in a first direction, the first signal being polarized in the first direction, said first sector of the first base station being oriented in a third direction and including said first first-carrier antenna;

wherein said step of operating a first sector of the first base station is performed while the first sector of the first base station is adjacent a second base station, said second base station being at a location which is in said third direction relative to said first base station, the second base includes a second base station sector oriented in said third direction that transmits on the first carrier, using a second first-carrier antenna polarized in a second direction, the second signal being polarized in the second direction, the first and second directions being different;

wherein said first base station further includes a second sector of the first base station, said second sector of the first base sector being oriented in a fourth direction which is different from said third direction, said second sector of the first base station including a first carrier antenna polarized in the second direction; and wherein said first base station is located adjacent a third base station, said third base station being at a location which is in said fourth direction relative to said first base station, the third base station including a third base station sector oriented in said fourth direction, said third base station sector including a first carrier antenna polarized in the second direction.

19. The non-transitory computer readable medium of claim 18, wherein said first direction is a vertical direction and wherein said second direction is a horizontal direction.

20. The non-transitory computer readable medium of claim 18, further comprising:

machine executable instructions for controlling the first base station to transmit a second signal on a second carrier using a first second-carrier antenna that is included in said first sector of said first base station and has a different polarization than said first first-carrier antenna.

21. The non-transitory computer readable medium of claim 20, wherein the second base station transmits on the second carrier using a second second-carrier antenna that has a different polarization than said second first-carrier antenna.

22. A first base station comprising:

a first processor configured to control a first sector of said first base station to transmit a first signal on a first carrier using a first first-carrier antenna polarized in a first direction, the first signal being polarized in the first direction, said first sector of the first base station being oriented in a third direction and including said first first-carrier antenna;

wherein said first sector of the first base station is located adjacent a second base station, said second base station being at a location which is in said third direction relative to said first base station, the second base station includes a second base station sector oriented in said third direction, said second base station including a second processor configured to control said second base station sector to transmit a second signal using a second first-carrier antenna polarized in a second direction, on the first carrier, the first and second directions being different;

wherein said first base station further includes a second sector of the first base station, said second sector of the first base sector being oriented in a fourth direction which is different from said third direction, said second sector of the first base station including a first carrier antenna polarized in the second direction; and wherein said first base station is located adjacent a third base station, said third base station being at a location which is in said fourth direction relative to said first base station, the third base station including a third base station sector oriented in said fourth direction, said third base station sector including a first carrier antenna polarized in the second direction.

23. The first base station of claim 22, wherein said first direction is a vertical direction and wherein said second direction is a horizontal direction.

24. The first base station of claim 22, wherein the first processor is further configured to:

control the first base station sector to transmit a third signal on a second carrier using a first second-carrier antenna having a different polarization than said first first-carrier antenna.

25. The first base station of claim 24, wherein the second processor is further con to:

control the second base station to transmit a fourth signal on the second carrier using a second second-carrier antenna having a different polarization than said second first-carrier antenna.

* * * * *